Patented Dec. 30, 1952

2,623,824

UNITED STATES PATENT OFFICE 2,623,824

GROWTH PROMOTING AGENT

Roger Gaudry, Sillery, Quebec, Canada, assignor to Ayerst, McKenna & Harrison, Limited, St. Laurent, Quebec, Canada, a corporation of Canada No Drawing. Application July 5, 1951,
Serial No. 235,365

2 Claims. (Cl. 99—4)

The present invention relates to an improved poultry and animal feed embodying as a growth-promoting agent α-amino-δ-hydroxyvaleric acid.

When poultry is fed a diet which is low in protein, arginine deficiency develops. This deficiency is shown by a reduction of the growth rate. To obtain a normal growth rate, the diet was either increased in protein content or supplemented with arginine. Both of these procedures present certain disadvantages either in the volume of feed which must be taken up by the poultry in order to obtain the necessary arginine supply or in the cost of preparing adequate feeds.

The applicant has found that these disadvantages can be overcome by adding α-amino-δ-hydroxyvaleric acid to a poultry feed which is low in protein. A feed results which is capable of insuring normal growth rate when fed to poultry.

The applicant prefers to substitute about 40% of the protein usually present in a normal feed by about 1% by dry weight of the α-amino-δ-hydroxyvaleric acid.

A feed according to the invention contains the normal elements of poultry sustenance namely, glycocoll, cystine, mineral salts, cellulose, choline hydrochloride, vegetable shortening, vitamins, cerelose and about 18% of protein instead of the usual 30% and 1% of the total dry weight of the growth promoting α-amino-δ-hydroxyvaleric acid.

EXAMPLES

The present invention will be further illustrated by referring to the following examples in which is shown a method for preparing the growth promoting α-amino-δ-hydroxyvaleric acid and the preparation of a preferred poultry feed embodying the growth promoting agent of the present invention.

EXAMPLE 1

The α-amino-δ-hydroxyvaleric acid is preferably prepared as follows:

2,3-dihydrofuran (40 g., 0.5 mole of a product titrating 88%) was added to 0.02 normal hydrochloric acid (100 ml.) and the mixture was mechanically stirred at room temperature until the dihydrofuran had completely dissolved (about ten minutes). The resulting solution was then slowly added to a solution of sodium cyanide (26 g.) and ammonium chloride (27 g.) in water (200 ml.) and the mixture was stirred at room temperature for one hour. Fresh ammonium carbonate (106 g.) was then added, the mixture was stirred at 55°–60° C. for two hours, then at the boiling point for 15 minutes, and evaporated to dryness "in vacuo." The hot residue was stirred with absolute ethyl alcohol (200 ml.) the insoluble sodium chloride (28.5 g., 98%) was filtered on a Buechner funnel, washed on the filter with a little absolute alcohol, and the alcoholic solution was evaporated to dryness "in vacuo." The residue was dissolved in boiling water (400 ml.), the hot solution was added to a beaker containing barium hydroxide (200 g. of the octahydrate), stirred, and the mixture was heated at 160° C. for half an hour in an autoclave. After cooling, ammonium carbonate (25 g.) was added, the mixture was stirred and slowly brought up to the boiling point, cooled and filtered on a Buechner funnel. The clear solution was again taken to the boiling point, filtered hot, and evaporated to dryness "in vacuo." The residue was slurried with cold methyl alcohol (150 ml.) and the crude amino acid was filtered and dried. Yield 37 g. 55%. It was recrystallized by dissolving in boiling water (55 ml.) and adding ethyl alcohol (165 ml.). Yield, 33 g. 50% calculated from 2,3-dihydrofuran. M. P. 215° C. with evolution of gas. Litt., 223–224° C. (9). 218–220° C. (6). Calculated for $C_5H_{11}O_3N$: N, 10.52%. Found (Kjeldahl): N, 10.57%. Melting points are not corrected.

EXAMPLE 2

40 chicks were fed on the following diet for 10 days:

| | Percent |
|---|---|
| Casein | 18 |
| Glycocoll | 1 |
| Cystine | 0.3 |
| Mineral salts McC. 185 | 4.0 |
| Cellulose | 3.4 |
| Choline HCl | 1.0 |
| Crisco | 4.0 |
| Vitamins | 1.0 |
| Cerelose | 67.3 |

Mixture of vitamins

| | | |
|---|---|---|
| Riboflavin | mg | 100 |
| Inositol | mg | 10 |
| Pyridoxine | mg | 100 |
| p-Aminobenzoic acid | mg | 100 |
| Folic acid | mg | 10 |
| Thiamine | mg | 100 |
| Nicolinic acid | mg | 300 |
| Ca pantothenate | mg | 300 |
| Naphthaquinone | mg | 100 |
| Sucrose | g | 88.89 |

α-amino-δ-hydroxylvaleric acid: 1% of total dry weight.

Evaluation of the growth rate of the chicks showed that they grew better than the controls that were fed the arginine deficient diet which did not contain α-amino-δ-hydroxyvaleric acid.

This diet was found to be equivalent to a similar diet which contained 30% of casein instead of 18% and in which α-amino-δ-hydroxyvaleric acid was absent.

I claim:

1. A poultry feed, comprising protein-deficient poultry feed including α-amino-δ-hydroxyvaleric acid as a growth promoting agent.

2. A poultry feed, comprising a poultry feed having a deficiency in protein of about 40% and about 1% by weight of α-amino-δ-hydroxyvaleric acid as a growth promoting agent.

ROGER GAUDRY.

No references cited.